(12) United States Patent
LeVey et al.

(10) Patent No.: US 6,298,873 B1
(45) Date of Patent: Oct. 9, 2001

(54) TWO-WAY CHECK VALVE

(75) Inventors: Kenneth R. LeVey, West Chicago; David R. Nowak, Bloomingdale, both of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/494,991

(22) Filed: Jan. 31, 2000

(51) Int. Cl.[7] .............................. F16K 15/14; F16K 17/18
(52) U.S. Cl. ................... 137/493; 137/102; 137/493.8; 137/493.9; 137/512; 137/860
(58) Field of Search ..................... 137/102, 103, 137/493, 493.7, 493.8, 493.9, 512, 860, 614.2

(56) References Cited

U.S. PATENT DOCUMENTS

| | | |
|---|---|---|
| 3,451,422 * | 6/1969 | Chorkey ............................. 137/860 |
| 3,468,337 * | 9/1969 | Smirl ................................. 137/493.8 |
| 4,111,228 | 9/1978 | Simionescu . |
| 4,214,607 | 7/1980 | Bouteille . |
| 4,237,935 | 12/1980 | Delmonte et al. . |
| 4,428,566 | 1/1984 | deBaan et al. . |
| 4,497,749 | 2/1985 | Strauss . |
| 4,549,565 | 10/1985 | Short, III . |
| 5,126,722 | 6/1992 | Kamis . |
| 5,477,829 * | 12/1995 | Hassinger et al. ................ 137/493.8 |
| 5,623,958 * | 4/1997 | Bumpers ........................... 137/493.9 |
| 5,638,860 * | 6/1997 | DeRoche ........................... 137/493.8 |
| 5,660,205 | 8/1997 | Epstein . |
| 5,762,103 | 6/1998 | Gregoire . |
| 6,009,895 * | 1/2000 | Wass et al. ........................ 137/231 |
| 6,168,400 * | 1/2001 | Van Davelaar et al. .......... 137/493.8 |

FOREIGN PATENT DOCUMENTS

| | | | |
|---|---|---|---|
| 214597 | * 11/1956 | (AU) | ................................ 137/493.8 |
| 1038587 | * 9/1953 | (FR) | ................................ 137/493.8 |

\* cited by examiner

Primary Examiner—Michael Powell Buiz
Assistant Examiner—Ramesh Krishnamurthy
(74) Attorney, Agent, or Firm—Pitney, Hardin, Kipp & Szuch LLP

(57) ABSTRACT

The check valve has rotationally symmetric outer boundaries with a transverse plate separating a first portion which is intended to be within a first air space and a second portion which is intended to be within a second air space. Two internal passageways are formed within the interior of the check valve, each with an opening in the first portion and another opening in the second portion. The first and second portions each include a circular channel with flared walls into which one of the openings is formed. Each circular channel includes an O-ring which serves as a valve to control flow into the respective internal passageway.

7 Claims, 4 Drawing Sheets

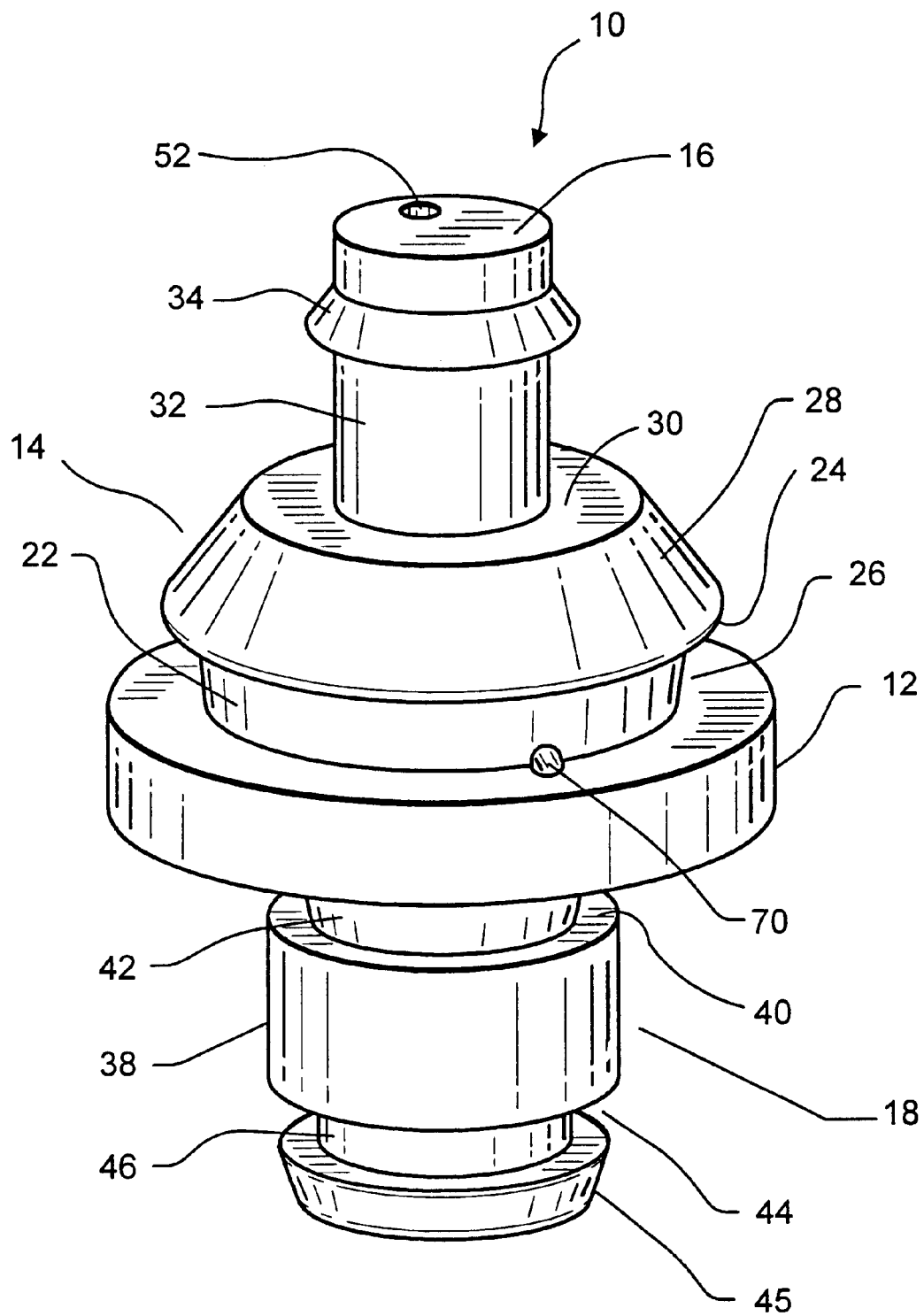
F I G. 4

TWO-WAY CHECK VALVE

BACKGROUND OF THE INVENTION

1. Field of the Invention

This invention pertains to a two-way check valve, such that air flow from an air space is through a first passageway, while air flow to the air space is through a second passageway. The first and second passageways include openings which are selectively sealed by O-rings.

2. Description of the Prior Art

In the prior art, flow limiters or check valves have been provided which are unidirectional. The bi-directional check valves and flow limiters, as well as many of the unidirectional check valves and flow limiters, have tended to have a complicated structure with attendant high manufacturing and maintenance costs. Moreover, some of these devices have not sealed the moment the plunger stopped moving and have not satisfactorily provided for consistency of performance due to the reliance on the dynamic movement of the lip seal. Similarly, many of these devices have not been self-cleaning thereby further increasing the maintenance costs.

Moreover, in the prior art, damping action can be dependent on the lip seal seating against the face of the plunger consistently. This action can be prone to gathering lubricants, debris and moisture caught in the "sandwiching" action. Moreover, a linear action must occur to move the lip seal from a sealed position to an unsealed position.

Representative prior art includes U.S. Pat. No. 5,762,10.3 entitled "Tilting O-Ring Check Valve" issued on Jun. 9, 1998 to Gregoire; U.S. Pat. No. 5,660,205 entitled "One-Way Valve" issued on Aug. 26, 1997 to Epstein; U.S. Pat. No. 5,126,722 entitled "Point of Lube Monitor" issued on Jun. 30, 1992 to Kamis; U.S. Pat. No. 4,549,565 entitled "Reclosing Rupture Disk Assembly" issued on Oct. 29, 1985 to Short, III; U.S. Pat. No. 4,497,749 entitled "Check Valve for Ammonia Injector Apparatus" issued on Feb. 5, 1985 to Strauss; U.S. Pat. No. 4,428,566 entitled "Two-Tube Hydropneumatic Shock Absorber" issued on Jan. 31, 1984 to de Baan et al.; U.S. Pat. No. 4,237,935 entitled "Hydraulic Pressure Relief Valve and Fluid Isolator" issued on Dec. 9, 1980 to Delmonte et al.; U.S. Pat. No. 4,214,607 entitled "Unidirectional Flow Limiter" issued on Jul. 29, 1980 to Bouteille; and U.S. Pat. No. 4,111,228 entitled "Respiratory Valve, Especially for Anaesthetic Circuits" issued on Sep. 5, 1978 to Simionescu.

OBJECTS AND SUMMARY OF THE INVENTION

It is therefore an object of this invention to provide a bi-directional check valve.

It is therefore a further object of this invention to provide a bi-directional check valve which has a simple design.

It is therefore a still further object of this invention to provide a bi-directional check valve which has reduced maintenance requirements.

It is therefore a still further object of this invention to provide a bi-directional check valve which can be configured in a self-cleaning configuration.

It is therefore a still further object of this invention to provide a bi-directional check valve which seals the moment the plunger stops moving.

It is therefore a still further object of this invention to provide a bi-directional check valve which has consistency of performance.

It is therefore a still further object of this invention to provide a bi-directional check valve which is economical to manufacture.

These and other objects are attained by providing a bi-directional check valve with a unitary body with two portions separated by a transverse plate and two passageways therethrough. The first portion is intended to be in communication with a first air space while the second portion is intended to be in communication with a second air space. A first of these passageways leads from an opening in a circular channel in which an O-ring is engaged in the first portion to an opening in the end of the second portion. Likewise, the second of these passageways leads from an opening in a circular channel in which an O-ring is engaged in the second portion to opening in the end of the first portion. The O-rings selectively open and close the openings of the passageways in response to pressure differences between the first and second air spaces.

BRIEF DESCRIPTION OF THE DRAWINGS

Further objects and advantages of the invention will become apparent from the following description and claims, and from the accompanying drawings, wherein:

FIG. 4 is an upper perspective view of the check valve of the present invention.

DETAILED DESCRIPTION OF THE PREFERRED EMBODIMENT

Figure 1:
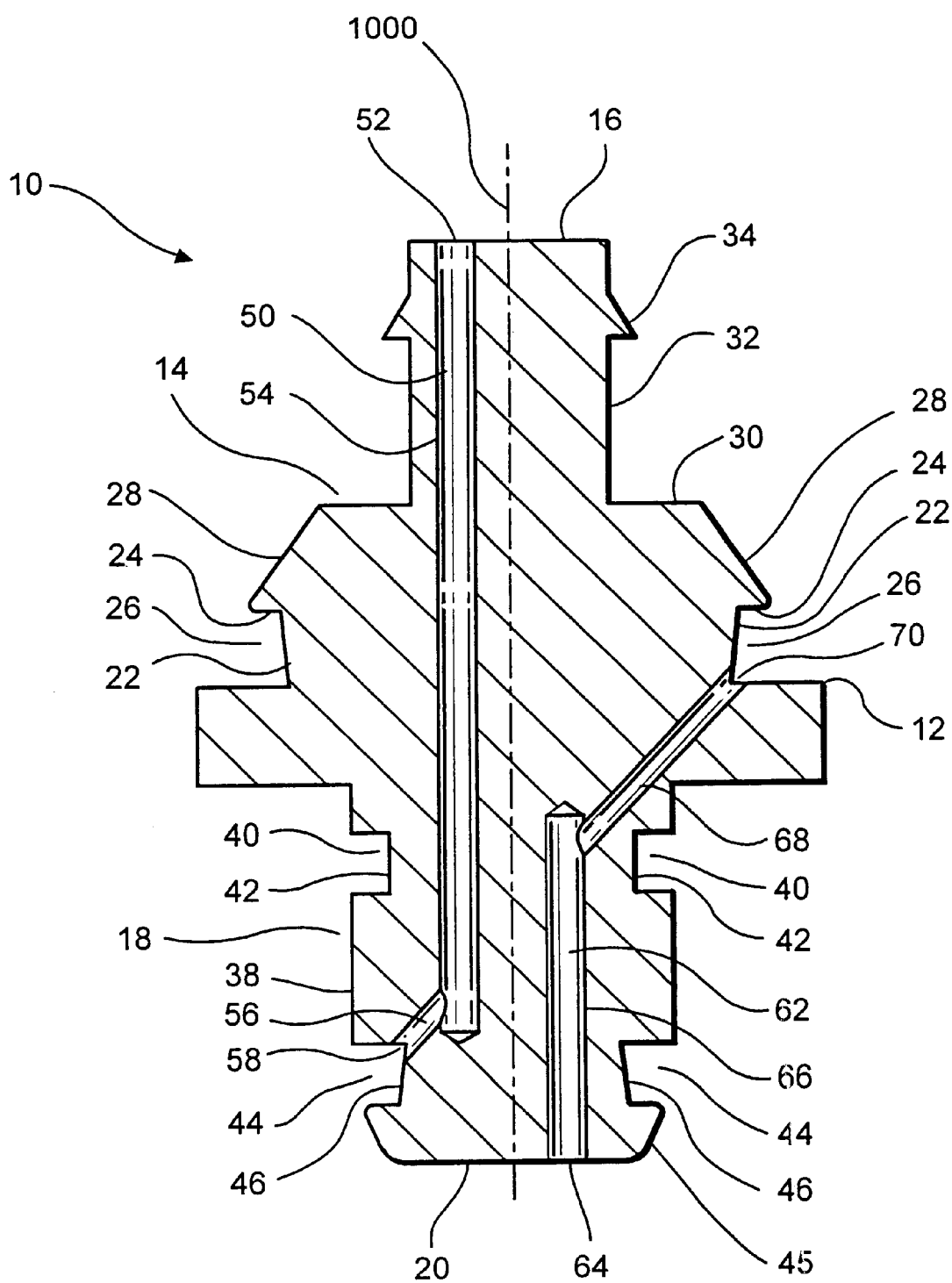
FIG. 1 is a cross-sectional view of the check valve of the present invention.

Referring now to the drawings in detail wherein like numerals refer to like elements throughout the several views, one sees that FIG. 1 is a cross-sectional view showing the outer boundaries and inner detail of the check valve 10 of the present invention. While the outer boundaries are generally rotationally symmetric about axis of rotation 1000, the interior detail is asymmetric.

Check valve 10 includes central transverse disk plate 12 with upper portion 14 extending upwardly therefrom, terminating in upper surface 16, and lower portion 18 extending downwardly therefrom, terminating in lower surface 20 (the terms "upper" and "lower" are relative, and refer to the orientation illustrated in the various figures). Upper portion 14 includes toroidal walls 22 formed immediately above central transverse disk plate 12. Toroidal walls 22 flare slightly outwardly as walls 22 extend away from central transverse disk plate 12. Lip 24 is formed above toroidal walls 22 thereby forming first circular seal channel 26 outwardly adjacent from toroidal walls 22. Inwardly tapering walls 28 extend upwardly from lip 24 with toroidal plateau 30 formed thereabove. Cylindrical stem 32 extends upwardly from toroidal plateau 30 and terminates in upper surface 16. Downwardly flared circular detent lip 34 is formed on the walls of stem 32 downwardly adjacent from upper surface 16.

Lower portion 18 includes cylindrical section 38 with second circular seal channel 44 formed upwardly adjacent from lower surface 20 and third circular seal channel 40 formed downwardly adjacent from central transverse disk plate 12. Lower portion 18 further includes tapered walls 45 formed between second circular seal channel 44 and lower surface 20. Third circular seal channel 40 includes inner wall 42 which is parallel with the outer wall of cylindrical section 38. However, second circular seal channel 44 includes inner wall 46 which is slightly flared so as to have a slightly smaller diameter as inner wall 46 extends upwardly in the direction toward central transverse disk plate 12.

Figure 3:
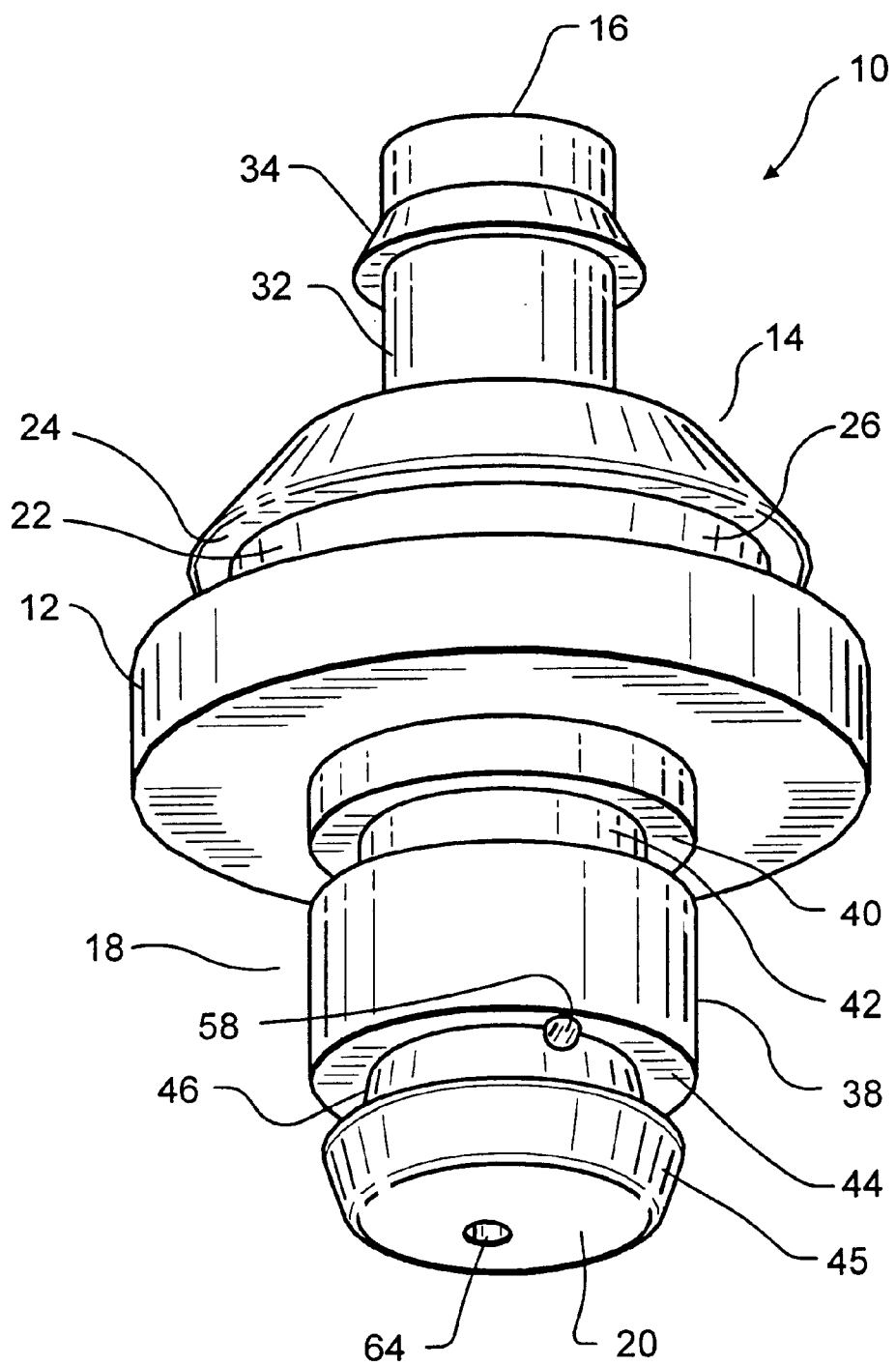
FIG. 3 is a lower perspective view of the check valve of the present invention.

First internal passageway 62 includes opening 64 in lower surface 20, with upwardly extending vertical shaft 66 leading to upper diagonal shaft 68 and opening 70 in first circular seal channel 26. Likewise, second internal passageway 50 includes opening 52 in upper surface 16, with downwardly extending vertical shaft 54 leading to lower diagonal shaft 56 and opening 58 in second circular seal channel 44. FIGS. 3 and 4 are perspective views which show openings 52, 58, 64 and 70. In order to position or seat the first and second O-rings 72, 76 properly, openings 70, 58 are formed at the portion of first and second circular seal channels 26, 44 which have the slightly reduced diameter due to the flaring of walls 22, 46, respectively.

Figure 2:
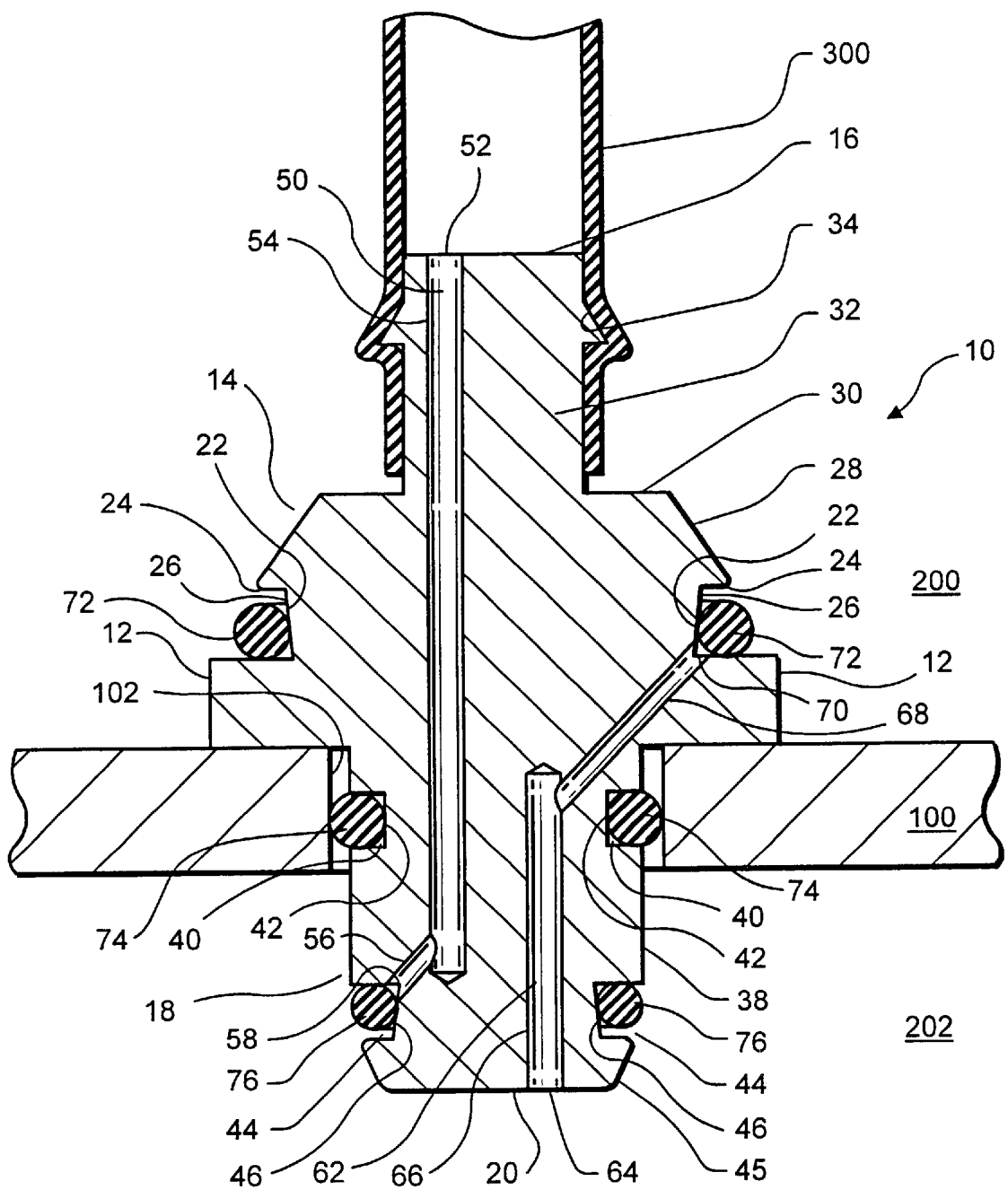
FIG. 2 is a cross-sectional view of the check valve of the present invention, shown in a typical installed position.

As shown in FIG. 2, a typical installed position is shown wherein first O-ring 72 is installed and engaged within first circular seal-channel 26, second O-ring 76 is installed and engaged within second circular seal channel 44, and third O-ring 74 is installed and engaged within third circular seal channel 40. First and second O-rings 72, 76 have some "play" within first and second circular seal channels 26, 44 so as to selectively seal and unseal openings 70, 58, respectively. However, typically third O-ring 74 is tightly engaged within third circular seal channel 40 without significant "play" therewithin.

Typically, plate 100 in FIG. 2 separates first air space 200 from second air space 202. Check valve 10 is inserted and press fitted into aperture 102 of plate 100 with third O-ring 74 being tightly engaged and maintaining the separation between first and second air spaces 200, 202. Additionally, hose 300, typically providing a source of clean air or clean gas, extends around cylindrical stem 32. Downwardly flared circular detent lip 34 engages hose 300 and tends to prevent the removal of hose 300 from cylindrical stem 32.

As pressure builds in second air space 202, second O-ring 76 is urged against opening 58 thereby sealing second internal passageway 50. The flaring of inner wall 46 within second circular seal channel 44 aids in the proper positioning of second O-ring 76. Simultaneously, the pressure in first internal passageway 62 wile increase, urging first O-ring 72, which is ordinarily positioned against opening 70 in first circular seal channel 26 by the action of toroidal walls 22, away from opening 70 thereby allowing air pressure to drop in second air space 202 until it equalizes with the air pressure in first air space 200. When second air space 202 pulls a vacuum or reduced air pressure with respect to first air space 200, the reduced air pressure in first internal passageway 62 pulls on first O-ring 72 causing first O-ring 72 to seal against opening 70. However, because the pressure in second internal passageway 50 (which is in communication with the air or gas provided by hose 300) is greater than in second air space 202 second O-ring 76 pulls away from opening 58 allowing the pressure in second air space 202 to equalize. Second internal passageway 50 opens into hose 300 which provides a source of clean air. Check valve 10 therefore allows for clean air to flow from hose 300 through second internal passageway 50 to second air space 202. Check valve 10 further allows for dirty air to flow from second air space 202 through first internal passageway 62 and into first air space 200. Moreover, the minimal movement of O-rings 72, 76 allows for internal passageways 50, 62 to remain clear by eliminating any "sandwiching" effect during operation.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A two-way check valve comprising:

a first portion and a second portion;

a plate separating said first portion from said second portion;

a first internal passageway including a first circular channel in said first portion and a second opening in said second portion, wherein a first opening is formed in said first circular channel;

a second internal passageway including a third opening in said first portion and a second circular channel in said second portion, wherein a fourth opening is formed in said second circular channel;

said first circular channel including a first o-ring as a first valve means for selectively opening and closing said first opening allowing flow from said second portion to said first portion while blocking flow from said first portion to said second portion; and said second circular channel including a second o-ring as a second valve means for selectively opening and closing said fourth opening allowing flow from said first portion to said second portion and blocking flow from said second portion to said first portion.

2. The check valve of claim 1 wherein outer boundaries of the check valve are rotationally symmetric about an axis of revolution and wherein said plate is perpendicular to said axis of revolution.

3. The check valve of claim 2 wherein interior walls of said first circular channel and said second circular channel are tapered thereby tending to position said first o-ring against first opening and tending to position said second o-ring against said fourth opening.

4. The check valve of claim 3 wherein said first circular channel and said second circular channel are somewhat wider than said first O-ring and said second O-ring, respectively, thereby allowing play of said first O-ring and said second O-ring within said first circular channel and said second circular channel, respectively.

5. The check valve of claim 4 wherein said second opening is formed on an end of said second portion, and wherein said third opening is formed on an end of said first portion.

6. The check valve of claim 5 further including a third circular channel substantially adjacent to said plate and a third O-ring within said third circular channel for maintaining a seal between a first air space into which said first portion is inserted and a second air space into which said second portion is inserted.

7. The check valve of claim 6 wherein said first portion includes a stem for receiving a hose, the stem including a flared detent lip for engaging the hose.

* * * * *